Feb. 20, 1962 J. F. GRUNDMANN 3,021,739
HYDRAULICALLY CONTROLLED AND OPERATED POWER TONG
Filed Dec. 23, 1957 6 Sheets-Sheet 3

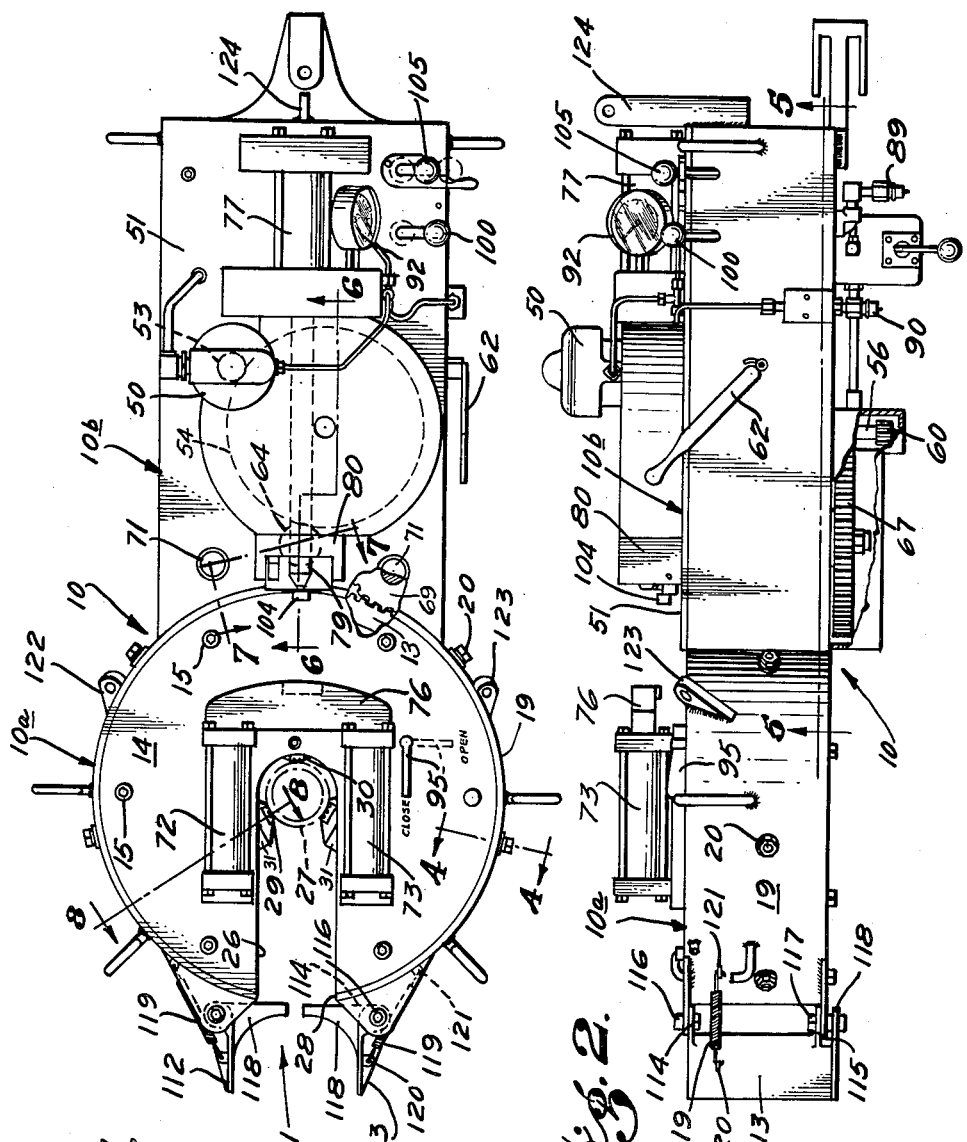

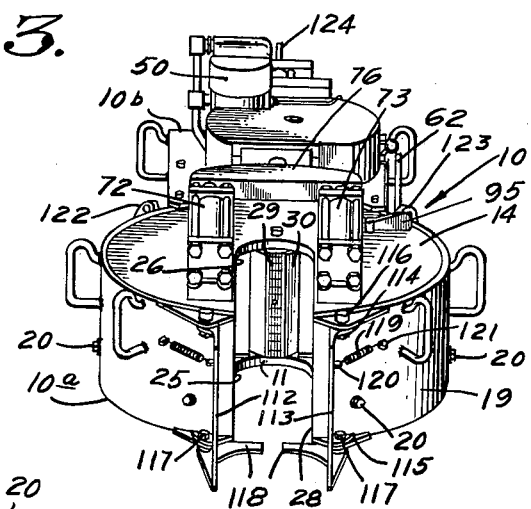
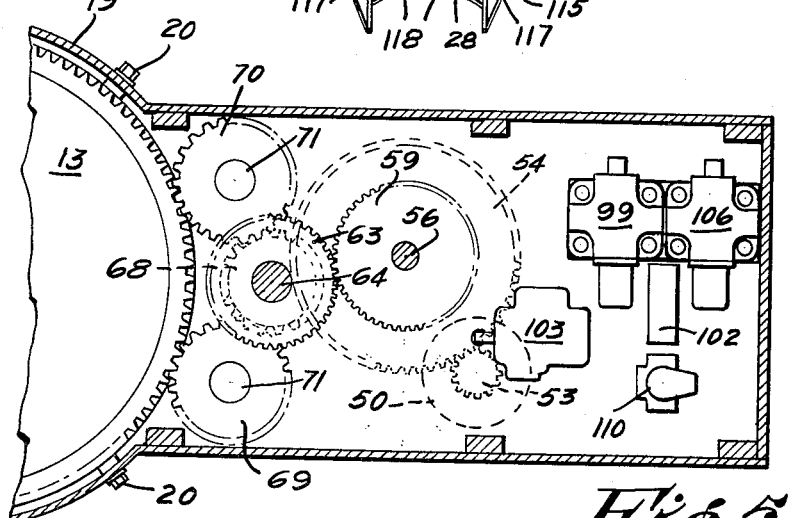
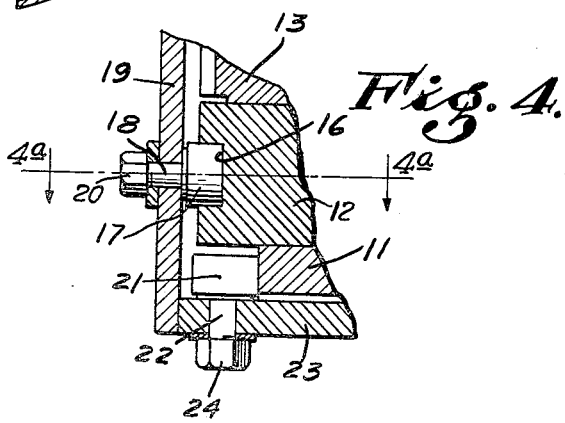

JOHN F. GRUNDMANN,
INVENTOR.
WHANN & McMANIGAL
Attorneys for Applicant

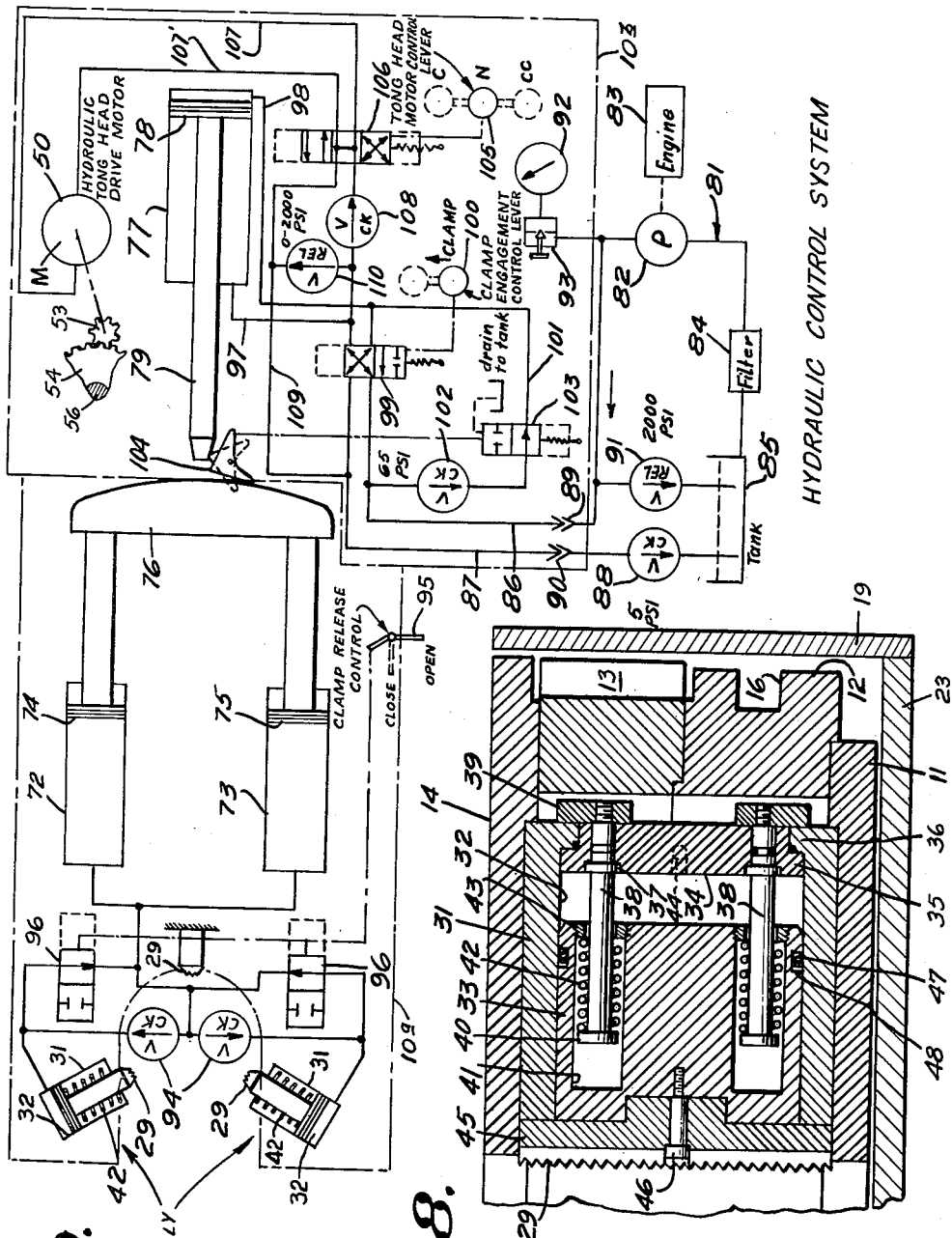

Feb. 20, 1962 J. F. GRUNDMANN 3,021,739
HYDRAULICALLY CONTROLLED AND OPERATED POWER TONG
Filed Dec. 23, 1957 6 Sheets-Sheet 5

JOHN F. GRUNDMANN,
INVENTOR.
WHANN & McMANIGAL
Attorneys for Applicant

Feb. 20, 1962 J. F. GRUNDMANN 3,021,739
HYDRAULICALLY CONTROLLED AND OPERATED POWER TONG
Filed Dec. 23, 1957 6 Sheets-Sheet 6
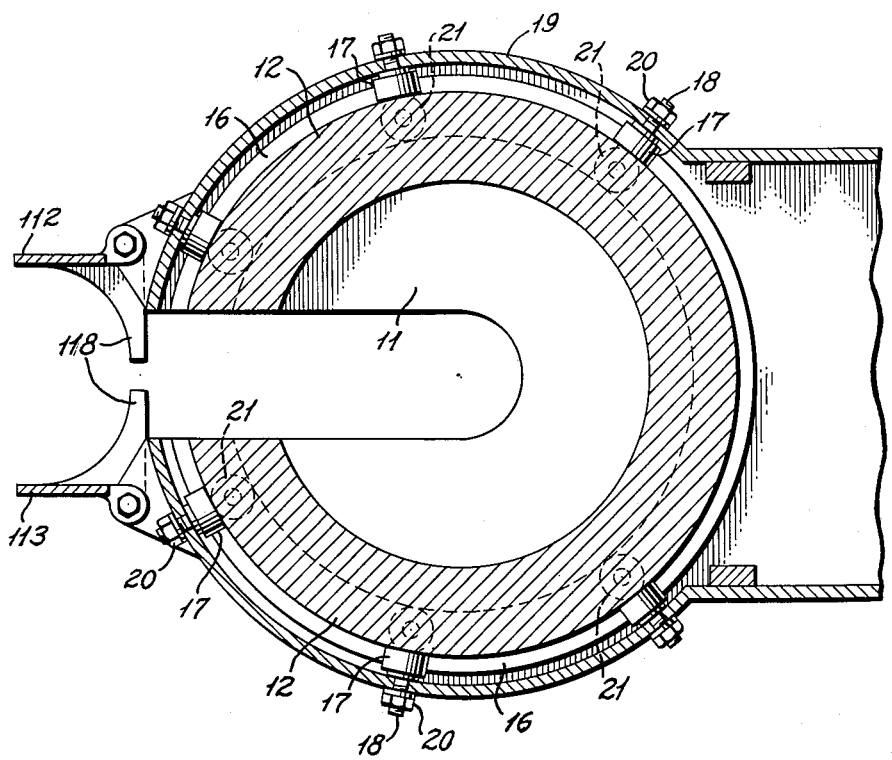
Fig. 4.ª
INVENTOR
John F. Grundmann
BY Whann & McManigal
ATTORNEYS United States Patent Office 3,021,739
Patented Feb. 20, 1962

3,021,739
HYDRAULICALLY CONTROLLED AND
OPERATED POWER TONG
John F. Grundmann, Redondo Beach, Calif., assignor, by mesne assignments, to Joy Manufacturing Company, a corporation of Pennsylvania
Filed Dec. 23, 1957, Ser. No. 704,817
19 Claims. (Cl. 81—53)

This invention relates generally to a tong of the type utilized for screwing together and unscrewing pipe sections and other tubular members, and is more particularly concerned with tongs such as used in oil well drilling operations.

Heretofore, most conventional tongs have been so constructed that the gripping forces applied to the pipe or tubing will be increased as the torque forces are increased. In other words, the torque and gripping forces have been interrelated in such a manner that they cannot be independently controlled. As a result, tongs as presently constructed are thus inherently not adapted for use with pipes of thin walled construction as are being more recently used. Having in mind the inherent disadvantages of presently constructed tongs, it is one object of the present invention to provide a tong which may be power actuated, and having pipe or tube gripping members so arranged that the gripping forces and the torque forces are applied independently, thus enabling the tong to be used on thin walled pipes or tubes without damage thereto.

Further, most conventional tongs in which the gripping forces are applied through cam action or other means, depending upon the extent of torque forces applied, the tong must be removed from the pipe and applied in reverse direction, whenever desired to reverse the direction of rotation of the pipe by the tong. Such operation is slow and time consuming. In the present invention, it is contemplated to provide a power actuated tong in which the gripping members may be rotated in clockwise or counterclockwise direction, as desired, without the necessity of having to release the gripping members or reverse their gripping direction.

A further object of the herein described invention is to provide power driven tong apparatus for use on pipes and tubes, wherein impact torque forces may be applied for the purpose of breaking loose tight joint connections.

A still further object of the invention is to provide a power tong having parts which may be actuated into gripped and ungripped relation with a pipe or tube, and when the parts are in gripped relation will permit the tong as a unit to be utilized as an elevator.

Another object is to provide a power tong in which the gripping elements are so arranged that they will be hydraulically balanced and equalize the gripping pressure with respect to the gripping elements.

Still another object is to provide a power tong in which certain of the operating elements are interlocked in such a way that predetermined positions of safe operation must be assumed before the tong may be operated.

Further objects of the invention will be brought out in the following part of the specification, wherein detailed description is for the purpose of fully disclosing several embodiments of the invention without placing limitations thereon.

Referring to the accompanying drawings, which are for illustrative purposes only:

FIG. 1 is a top plan view of a power tong constructed according to the present invention with a portion broken away to illustrate the tong head drive gearing;

FIG. 2 is a side elevational view of the same;

FIG. 3 is an isometric view showing the details of the pipe receiving end of the tong;

FIG. 4 is an enlarged fragmentary sectional view showing details for mounting the rotatable ring gear, taken substantially on line 4—4 of FIG. 1;

FIGURE 4a is a horizontal sectional view taken along the line 4a—4a of FIGURE 4;

FIG. 5 is a horizontal fragmentary sectional view looking towards the bottom of the power tong, and showing details of the driving connections with the ring gear, taken substantially on line 5—5 of FIG. 2;

FIG. 8 is an enlarged vertical fragmentary sectional view showing details of the pipe gripping means, taken substantially on line 8—8 of FIG. 1;

FIG. 9 is a view diagrammatically illustrating the power tong of the present invention and the hydraulic control system therefor.

Figure 6:
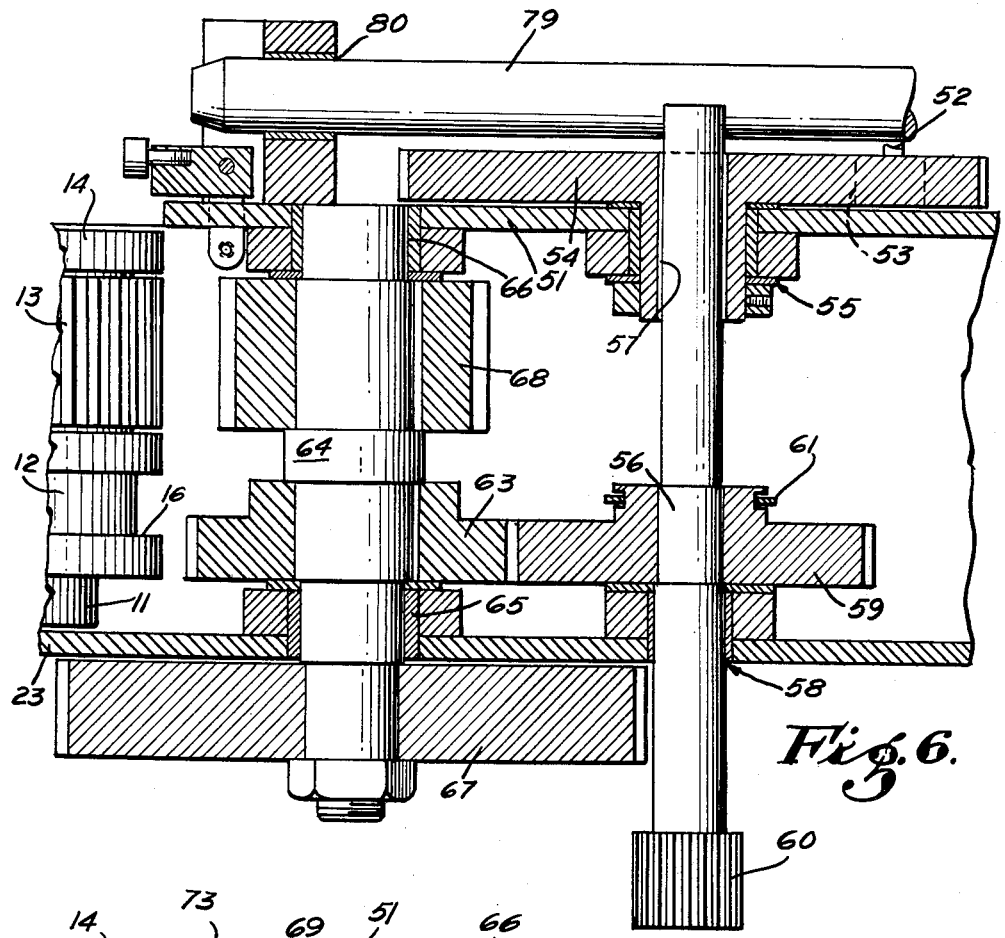
FIG. 6 is an enlarged fragmentary vertical sectional view through the driving connection, taken substantially on line 6—6 of FIG. 1.

Referring more specifically to the drawings, for illustrative purposes, there is disclosed in FIG. 1 a power tong according to the present invention. As will be seen, the operative instrumentalities of the tong apparatus are contained within or associated with a housing structure as generally indicated by the numeral 10. This housing structure is composed in the main of a tong head portion 10a of generally circular configuration, and a tong shank portion 10b of generally rectangular shape.

The tong head portion houses a rotatably mounted head assembly driven by gearing as shown in the broken away portion in FIGURE 1 and more specifically illustrated in FIGURE 5. The head assembly comprises a bottom plate 11, an annular spacer 12, a ring gear 13 and a top plate 14. These parts are secured together in superposed relation and so secured by a plurality of through bolts 15 (FIG. 1) interconnecting the top and bottom plates. These through bolts pass through passages in the ring gear and spacer, these parts thereby being clampingly secured between the top and bottom plates.

Referring now to FIG. 4, the manner in which the tong head assembly is rotatably supported will now be described. As shown, the spacer 12 is constructed with a circumferentially extending peripheral groove 16 within which there are positioned a plurality of rollers 17, each of these rollers being rotatably supported on a spindle 18 which is retained in a side wall 19 of the tong head housing portion 10a by a securing nut 20. It will appear from FIG. 4a that the rollers 17 are positioned at circumferentially spaced intervals around the rotatably mounted tong head assembly. The rollers 17 thus cooperate with the walls of the groove 16 to support the tong head assembly against axial displacement with respect to its axis of rotation. For radially positioning the tong head assembly and holding it against displacement at right angles to its axis of rotation, there are provided a plurality of rollers 21. Each of these rollers is mounted for rotation upon a spindle 22 extending at right angles to the spindles 18 and being secured in a bottom wall 23 of the housing 10 and held in position by means of a securing nut 24. The rollers 21 are likewise positioned at circumferentially spaced intervals around the periphery of the bottom plate 11 and by engagement with the peripheral edge of the bottom plate, these rollers act to hold the tong head assembly against displacement at right angles to the axis of rotation thereof.

As shown primarily in FIGS. 1 and 3, the bottom plate and top plate are respectively provided with radially extending slots 25 and 26, these slots being vertically aligned and communicating at their outermost ends with openings (not shown) in the spacer 12 and ring gear 13 so as to enable lateral movement of a pipe or tube, as indicated in phantom lines by numeral 27, into and out of a tong operative position, when the outermost end of the slots are brought into registration with an opening 28 of the side wall 19.

The rotatable tong head assembly carries three pipe gripping dies 29 having 120 degree angular spacing around the axis of rotation. One of these dies is positioned at the innermost end of the pipe receiving opening and is fixedly secured to a stationary mounting structure 30 secured by conventional means between the bottom plate 11 and top plate 14, as shown best in FIG. 3.

The other two dies are respectively supported upon a movable mounting so that the dies may be actuated into pipe gripping and non-gripping positions. Since both of the movable dies are similarly arranged and actuated, only one mounting and actuating structure will be described, reference being made to FIG. 8. A cylinder block 31 is clampingly secured between the bottom plate 11 and top plate 14, the cylinder block being fabricated with a cylindrical bore 32 within which a piston 33 is slidably mounted. The bottom end of the cylindrical bore is closed by a head member 34, this member having a peripheral projecting flange 35 which overlies and is sealed with respect to an inturned flange 36 formed on the cylinder block. The head member is secured by the clamping action between a shoulder 37 formed on a stud member 38 and a nut 39 which threadedly engages one end of the stud member and is of sufficient diameter to extend over the inturned flange 36 of the cylinder block.

The stud members 38 have headed ends 40 which are positioned within open ended bores 41 provided in the piston 33. A compression spring 42 is mounted on each stud member with one end bearing against the head 40 and the other end bearing against a bushing 43 threadedly secured in the open end of the bore 41. The springs 42 therefore act to bias the piston 33 toward the right or a retracted position within the cylinder bore 32, as seen in FIG. 8. By supplying a fluid under pressure through a passage 44 to the space in the cylinder bore 32 between the confronting faces of the piston 33 and the head member 34, the piston may be forced into an extended position against the pressure of the springs 42. As shown, the outer end of the piston 33 carries a die retainer member 45 to which the die 29 is secured by conventional means, the die and its retainer being secured to the piston by means of a stud bolt 46. The piston is shown as being sealed with respect to the cylinder bore by means of a conventional O-ring 47 seated in a peripheral groove 48 in the piston wall. With this arrangement, the two movably mounted dies may be actuated to and from gripping and non-gripping positions, and thus cooperate with the stationarily mounted die to clamp the tong head assembly to the pipe 27, when desired to apply a turning force thereto, or disengage the pipe when desired.

Torque forces for rotating the tong head assembly are derived from a separate driving mechanism housed within the shank portion 10b of the housing structure. In the embodiment shown in FIGS. 1 to 3, the driving source of power is a hydraulic motor 50 which is mounted exteriorly on top of an upper wall 51 of the housing, the motor being provided with a driving shaft 52 (FIG. 6) on which a driving pinion 53 is mounted. The pinion 53 meshes with a speed reducing gear 54 supported for rotation in a bearing structure 55 mounted on the upper wall 51. The gear 54 connects with a main drive shaft 56 through a spline connection 57 which permits axial shifting of the main drive shaft, the lower end of the shaft being supported in a bearing structure 58 mounted on the bottom wall 23 of the housing. The main drive shaft carries a high speed driving gear 59 and a low speed driving pinion 60.

Figure 7:
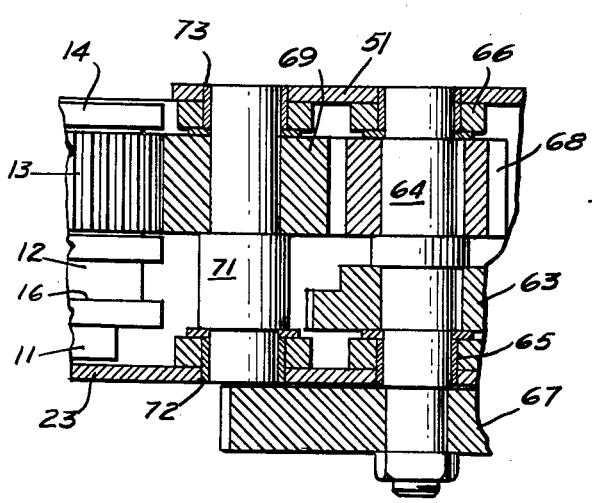
FIG. 7 is an enlarged fragmentary detail vertical sectional view, taken substantially on line 7—7 of FIG. 1.

The shaft 56 may be axially shifted by means of a fork 61 having mechanical connection with a shifting lever 62 which is conveniently accessible from the exterior of the housing to the operator. The high speed driving gear is arranged to mesh with a high speed driven gear 63 carried by countershaft 64, this countershaft being rotatably supported in a lower bearing 65 and an upper bearing 66. Upon shifting the gear 59 so that it disengages gear 63, the pinion 60 will mesh with a low speed driving gear 67 which is also carried by the shaft 64. The driving speed of the shaft 64 may therefore be varied depending upon whether the high speed or low speed connection is selected. The pinion 68 drives the ring gear 13 through a pair of idler gears 69 and 70 mounted on individual shafts 71 rotatably supported in lower and upper bearings 72 and 73, as best shown in FIGS. 5 and 7. By utilizing spaced driving pinions 69 and 70, the drive compensates for the open portion in the ring gear, as previously explained. One or the other of these idler gears will always be in meshed relation with the ring gear.

From the foregoing description, it will be appreciated that the gripping force of the dies 29 on the pipe may be separately controlled from the application of torque driving forces from the hydraulic motor 50. The mechanism by which the fluid actuated dies are energized comprises certain components which are assembled with and carried by the rotatably mounted tong head assembly, and other parts which are mounted and carried by the portion of the power tong associated with the shank portion 10b of the housing, but the two assemblies are operable into cooperable relationship as will hereinafter be explained.

The components carried by the tong head assembly, as shown in FIGS. 1 and 2 comprise a pair of fluid cylinders 72 and 73 having operatively associated pistons 74 and 75 (FIG. 9) which are connected to a common yoke member 76 for unitary operation. The fluid cylinders 72 and 73 are connected through control elements, which will subsequently be described in detail, with the cylinders 32 for actuating the movable dies 29, so as to form a self-contained hydraulic system which is so arranged that when the yoke 76 is moved from extended position to the retracted position, as shown in FIG. 1, fluid will be forced into the cylinders 32. The dies are then moved against the action of the compression springs 42 into gripped relation with the pipe. Upon release of the pressure in the cylinders 32, the springs 42 act to withdraw the dies from the pipe to a non-gripping position and by return flow of fluid to the cylinders 72 and 73 will again force the yoke 76 to its extended position.

The components of the hydraulic fluid system for actuating the dies which are associated with the shank portion 10b of the housing, comprise a fluid cylinder 77 within which there is a slidable piston 78 (FIG. 9) which is arranged to move an actuator rod 79 having its projecting end supported for sliding movement in a bearing 80. The actuator rod 79 in its retracted position has its outer end positioned clear of the rotatable tong head assembly, but is so aligned that when extended it will engage with the yoke 76 and move the yoke to its retracted position, whereupon the rod 79 may be moved in an opposite direction away from the yoke so as to permit rotation of the tong head assembly.

Referring now to FIG. 9, the hydraulic control for the power tong will now be described. The broken line representations on FIGURE 9 indicate the parts and hydraulic lines carried by the rotatably mounted head assembly on the tong head portion 10a and on the tong shank portion 10b, respectively. The fluid pressure for operating the tong of the present invention may be supplied from any suitable source, and is shown in the present instance as emanating from a fluid source as generally indicated at 81. As shown, this source comprises a pump 82 driven by a suitable power device such as an engine 83. The inlet side of the pump is connected to take fluid through a suitable filter 84 from a reservoir or tank 85.

The outlet side of the pump 82 delivers fluid under pressure to a supply conduit 86, and a return conduit 87 conducts returning fluid back to the tank through a check valve 88 having a low opening pressure.

The fluid source is connected to the supply and return conduits through appropriate couplings 89 and 90, respectively. The pump is protected by a bypass from the pump outlet to the tank 85, this bypass containing a relief valve 91. The outlet pressure of fluid from the pump is indicated on a pressure gauge 92, the supply pulsations of the fluid being dampened by a needle valve 93.

With the pipe gripping dies in open or ungripped position, the operation of closing these dies will now be described. The fluid cylinders 72 and 73 have a common connection from which fluid supply is conducted respectively through individual check valves 94—94 to the cylinder bores 32—32, when the yoke 76 is moved in a direction to move the pistons 74 and 75 towards the left, as shown in FIG. 9.

In order, however, to hold the pipe gripping dies in closed position, a control lever 95 must first be moved to its dotted line position. This lever controls the actuation of two-position valves 96—96 which are respectively positioned in bypasses around the two check valves 94—94. In the open, full line position, of the lever 95, the valves 96 are in a position to permit return fluid flow from the cylindrical bores 32 respectively to the cylinders 72 and 73, while in the closed, dotted line position, of the lever the valves 96 are moved to a position where return flow is cut off.

Having the control lever 95 in its closing position, the yoke 76 is now forced to the left by energizing the fluid cylinder 77 as will now be explained. The opposite ends of the cylinder 77 are in communication with conduits 97 and 98. Control of supply to these conduits and their connection with respect to the supply conduit 86 and return conduit 87 is accomplished through a two-position valve 99 which is under control of a clamp control lever 100. This lever in its full line position operates the valve 99 to a position wherein the conduit 97 connects with the supply conduit 86 and the conduit 98 connects with the return conduit 87. Movement of the control lever 100 to its dotted line position moves the valve 99 to a position wherein the conduit 97 connects directly with the return conduit 87, and flow between the conduit 98 and the supply conduit 86 is blocked.

It will be observed that there is a bypass connection 101 around the valve 99 between the supply conduit 86 and the conduit 98, this bypass connection containing a check valve 102 set to open at substantially 65 p.s.i. as shown on FIGURE 9 of the drawings and a two-position valve 103 under control of a cam member 104 associated with the yoke 76 and the actuating rod 79. This cam is arranged so that in the extended position of the yoke 76, the cam will act to position the valve 103 for flow through the bypass, but with the cam member 104 in its dotted line position, the valve 103 will be moved by an associated spring to its other position wherein flow through the bypass 101 is blocked. The cam 104 is held in its full line position by the yoke 76, when extended, and during such time as the actuating rod 79 is extended to move the yoke away from the cam. However, if the yoke 76 is in retracted position, and the actuating rod 79 is returned to its retracted position, then the cam will move to its dotted line position for a purpose to be hereinafter explained.

Proceeding now with the clamping operation of the dies 29, the clamp control lever 100 would be moved to its dotted line position, whereupon fluid pressure will be supplied from the supply conduit 86, through check valve 102, through valve 103 and the bypass 101 to conduit 98 so as to admit fluid pressure into the cylinder 77 on the side of the piston 78 to cause its movement toward the left and thus extend the actuating rod 79 to move the yoke 76 to retracted position. During this movement of the piston 78, the conduit 97 will conduct fluid from the cylinder through the valve 99 and thence to return conduit 87.

Movement of the yoke 76 causes the pistons 74 and 75 to force the fluid in the associated cylinders into the cylindrical bores 32 and thus close the dies 29 into clamping position against the action of the associated springs 42. Providing the control lever 95 is retained in closed position, the dies will remain clamped and the yoke 76 remain retracted.

Retraction of the actuating rod 79 is accomplished by returning the clamp control lever 100 to its full line position. This puts fluid pressure into the cylinder 77 through conduit 97, and connects conduit 98 with the return conduit 87, so as to move the piston 78 to a retracted position of the actuating rod 79. Since there is no load on the rod 79 during retraction movement, it will require only a low actuating pressure which is insufficient to open the check valves 102 and 108. These valves offer resistance to flow and will remain closed during this operation while the open hydraulic line to the back side of piston 78 applies the low actuation pressure to retract rod 79. In this position, the cam 104 moves to its dotted line position and actuates the valve 103 so as to block flow through the bypass 102 so long as the yoke 76 remains in retracted position away from the cam 104, or in other words while the dies 29 remain clamped. This, it will be observed, provides a safety feature.

Having clamped the dies, the operator is then ready to apply torque forces to rotate the tong head assembly. Rotation in either a clockwise or counterclockwise direction is controlled by means of a valve control lever 105 which is associated with a three position valve 106. In the mid position of the valve 106, the control lever occupies a "neutral position," the valve in this position having a shunt connection which extends across the conduit flow connections 107 and 107' of the hydraulic motor 50, so that under such circumstances fluid will not be conducted through the motor to operate it.

To operate the motor in a clockwise direction, the valve control lever 105 is shifted to the dotted line position "C," in which position the motor 50 will be energized through the following circuit: from the supply conduit 86, through the cross connection of valve 99, through a check valve 108 which, like check valve 102, offers resistance to fluid flow and may be set to open at substantially 65 p.s.i., through the cross-connection of valve 106, conduit 107' through the motor 50, thence through conduit 107, the cross-connection of valve 106, through conduit 109 and thence to return conduit 87.

To operate the hydraulic motor 50 in a counterclockwise direction, the valve control lever 105 will be moved to its dotted line position "CC." In this position the valve 106 will be changed so that instead of utilizing the cross-connection, the fluid will flow directly from the check valve 108, through conduit 107 and the motor 50, and thence through conduit 107' to the conduit 109. Thus, the direction of flow through the motor 50 is reversed.

It will be apparent that a very flexible control of the direction of rotation is thus obtained, and it is possible to jog the motor 50 in either direction as desired, thus allowing impact forces to be applied for the purpose of breaking loose the joint connections of the pipe or tubing clamped in the dies.

Adjustment of the torque which may be applied by the motor 50 may be accomplished by inserting an adjustable relief valve 110 across the motor supply conduits, ahead of the check valve 108. This relief valve may be adjustable from 0 to 2000 p.s.i. By utilizing a motor which is adapted to deliver 10,000 foot pounds of torque at 2000 p.s.i., it is possible by regulating the relief valve to adjust the motor so that it will deliver a lesser torque. For example, by regulating the relief valve so that only 1000 p.s.i. of fluid pressure is applied to the motor, the motor will then deliver a maximum of 5000 foot-pounds of torque force.

When it is desired to release the clamped dies 29, the valve control lever 105 should be placed in the neutral "N" position. The control lever 95 is then moved to the open position shown in full lines. In this position, the valves 96 are actuated to permit flow from the cylindrical bores 32 to the cylinders 72 and 73 under the action of the springs 42. This interchange of fluid forces the yoke 76 to extended position. The tong head assembly may then be rotated in a clockwise or counterclockwise direction by manipulating the control lever 105, and as the yoke 76 reaches a point where it contacts with the cam 104, the valve 103 will be actuated to a position where flow may take place through the bypass 101 to terminate the operation of the motor 50 at a point where the slots 25 and 26 are in registration with the opening 28. Flow of operating fluid will be short circuited with respect to the motor 50 by flow as follows: from the supply conduit 86, through check valve 102, through valve 103, continuing through bypass 101, thence through valve 99 cross-connection, to return conduit 87.

Referring now to FIGS. 1 and 3, the opening 28 in the head portion 10a of the housing structure is provided with a gate structure as generally indicated by the numeral 111 which is automatically closed and opened in response to movement of a pipe or tube into and out of the tong head. The gate is illustrated in its open position and is shown as comprising a pair of pivotally mounted doors or panels 112 and 113 which are respectively provided with an upper hinge lug 114 and a lower hinge lug 115 retained by pivot bolts 116 and 117 respectively. The panels are thus supported for swinging movement to opened and closed positions with respect to the opening 28. At the bottom of each door or panel, there is secured by conventional means a cam plate 118 which in the open position of the doors projects into the path of movement of a pipe or tube through the opening 28 into the rotatable tong head assembly. Movement of the pipe or tube upon contacting the cam plates will actuate the doors to closed position, whereas movement of the pipe or tube outwardly through the opening 28 will directly engage the doors and move them to open position. For retaining the doors in their respective closed or opened positions, each door is provided with a coiled spring 119, one end of the spring being anchored as at 120 to an associated door and at its other end as at 121 to the side wall 19. The springs are so arranged that they will move past a dead center position with respect to the door hinge pivots and thus will act to bias and retain the door panels in either closed or opened position, once the doors or panels are moved to such position.

Another feature of the tong of the present invention resides in the utilization of a three-point suspension which is provided by the two laterally positioned lifting lugs 122 and 123 which are positioned on opposite sides of the head portion 10a, and an end lug 124. By the use of cable connectors with these lugs, the power tong of the present invention may be suspended from a lifting hook, thus enabling use of the tong in connected relation to the pipe or tube to be used as an elevator. The tong thus performs a dual purpose and it is not necessary to disconnect the tong in order to affix a separate elevator to the pipe or tube.

In the mechanism previously described for actuating the dies 29 into gripped and ungripped positions, a fluid pressure actuating means has been utilized. Other arrangements may, however, be utilized, and in FIG. 10 there is disclosed a modified construction wherein mechanically associated parts are utilized, thus making it unnecessary to have an independent hydraulic system as previously explained for actuating the dies in response to operation of the actuator rod 79.

As there shown, the actuator rod 79 is arranged to pass through an opening 125 in the ring gear 13, this opening being so positioned that it will be axially aligned with the actuator rod 79 when the tong head assembly is rotated to a pipe or tube receiving position with respect to the opening 28. Upon extension of the actuator rod 79 by the actuating mechanism previously described, the end of the actuator rod passes through the opening 125 and engages with a yoke member 76' which is mounted within the ring gear 13, instead of exteriorly as in the previous arrangement.

The movable dies 29 are similarly positioned in the tong head assembly, and the two movable dies are respectively connected with the opposite ends of the yoke 76' through a linkage arrangement which will subsequently be described in detail. Since the operation of each die moving mechanism is similarly constructed, it is believed that it will only be necessary to describe the operating mechanism for one of these dies.

A die 29 is supported in a die retainer member 45' which is shown as being integrally formed with a projecting shank portion, as generally indicated at 126, this shank being slidably movable in a radially extending groove 126'. A pressure plate 127 is slidably supported for limited guided movement in a keyway 127' between the adjacent retainer member 45' on one side and a stop 128' affixed to the shank portion 126 on the other side. A plunger member 128 is slidably supported in the pressure plate 127 with one end projecting on one side of the pressure plate and a headed end on the other side of the pressure plate being positioned for movement in an open ended socket 129 formed in the die retainer member 45'. A compression spring 130 is seated in the socket with one end bearing against the adjacent end of the plunger member 128 and its other end bearing against the bottom of the socket.

The pressure plate 127 is connected with one end of the yoke 76' through a primary linkage consisting of links 140 and 141 interconnected by a common pivot pin 142 which also rotatably supports a roller 143. The other ends of the links 140 and 141 are respectively connected by a pivot pin 144 to the yoke 76', and a pivot pin 145 to the pressure plate 127. These links form an actuating toggle for moving the dies 29 into and out of engagement with the pipe structure.

Movement of the yoke 76' by the actuator rod 79 acts through the link 140 to cause the roller 143 to roll along an inner surface 146 of the ring gear until the link 141 passes through a dead center position into a dwell position wherein the roller 143, as shown in dotted lines, abuts a shoulder 147 formed on the ring gear. This movement of the link 141, causes the pressure plate 127 to move in a radial direction toward the pipe. This motion is transferred to the retainer member 45' and shank portion 126 through a wedge 153 to a shoulder 158 on plunger member 128, which in turn transfers the motion to the compression spring 130.

The shank portion 126 has a projecting lug 148 having sliding connection with a stationary rod 149 anchored at one end on a fixed support 150 carried by the tong head assembly. A compression spring 151, which has less compressive force than compression spring 130, surrounds the rod 149 and extends between the projecting lug 148 and the fixed support 150 with its ends respectively bearing against these elements. Thus, it will be evident that when the shank portion 126 is moved in a direction to carry the die 29 towards a pipe gripping position, the movement of the shank portion 126 will be opposed by the compression of the spring 151, and further that when the link 141 passes through its dead center it will be latched in the dwell position of the roller 143 by the action of this spring.

In addition to the primary actuating linkage described above, a secondary linkage is also provided in the form of an expansible link 152 connecting each end of the yoke 76' with a wedge member 153 which is interposed between the die retaining member 45' and the pressure plate 127. The link 152 is composed of two sections in end-to-end relation supported for relative axial movements and retained and biased towards an extended position by means of a compression spring 154. The wedge member 153 has a flat surface 155 which bears against a facing surface of the pressure plate 127, and an inclined surface 156 which is normally spaced from an adjacent correspondingly inclined surface 157 formed on the die retainer member 45'.

The purpose of the wedge 153 is to compensate for slight variations in pipe size due to wear and provide a regulation in the die operating mechanism which will automatically result in the application of maximum forces for setting the die into the pipe, such forces being applied as the link 141 approaches its dead center position as previously described.

Figure 10:
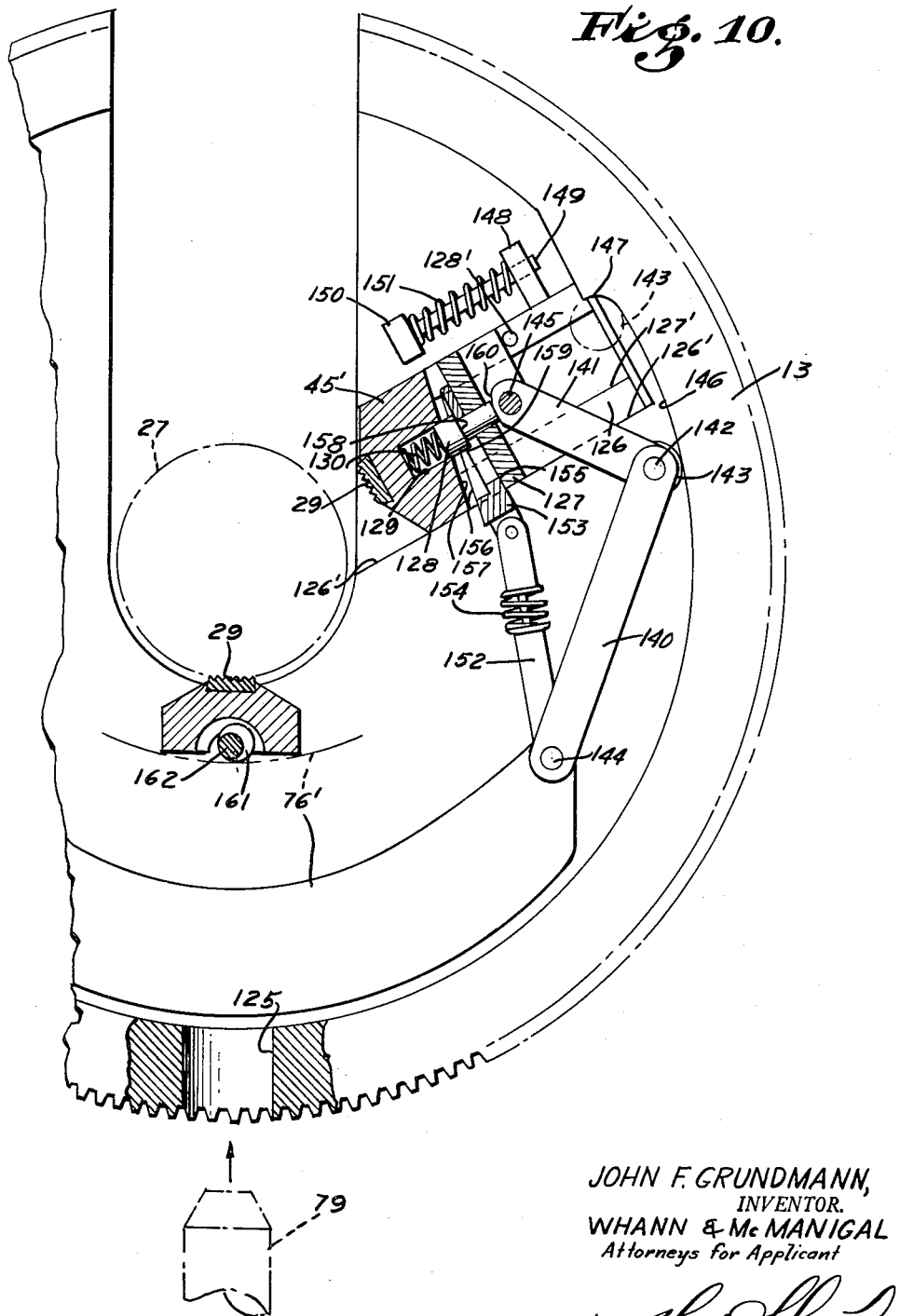
FIG. 10 is an enlarged fragmentary view, more or less diagrammatically illustrating a modified arrangement, wherein the gripping means are mechanically actuated rather than hydraulically actuated.

In the retracted position of the die 29, as shown in FIG. 10, the wedge is latched by the previously mentioned shoulder 158 on the plunger member 128, this shoulder being adapted to latchingly engage with a shoulder 159 formed on the wedge 153. It will be observed that the other end of the plunger 128 bears against a cam surface 160 formed on the adjacent end of the link 141. This cam surface is so formed that just before the link 141 reaches its dead center position, during which movement maximum forces will be applied, the cam surface 160 will depress the plunger 128 so as to unlatch the wedge 153. The wedge then enters the space between the die retaining member 45' and the pressure plate 127 until it seats its inclined surface 156 against the inclined surface 157, thus forming a solid block abutment between the die retainer member 45' and the pressure plate 127 during the application of the maximum die setting forces. The operation of the mechanical arrangement just described is such that similar operating characteristics will be obtained to those which utilize the hydraulic mechanism for operating the movable pipe engaging dies.

With the movably mounted dies in gripped relation with the pipe, the dies will be set and stay in gripped position due to the passage of the roller 143 through the dead center position of the link 141. In the locked position of the dies, the yoke 76' will have its innermost edge positioned, as shown in dot-and-dash lines, adjacent a tripping cam 161. This cam is carried on a rotatably mounted shaft 162 which is connected through conventional means to a manually or otherwise operable member conveniently positioned exteriorly of the tong head assembly, and by means of which the operator or other operating means, by turning the shaft 162, may move the cam 161 so that it will mechanically move the yoke 76' to a position in which the link 141 will pass back through its dead center position and be actuated by the action of spring 151 to the full line position as shown.

Various modifications may suggest themselves to those skilled in the art without departing from the spirit of my invention, and, hence, I do not wish to be restricted to the specific form shown or uses mentioned, except to the extent indicated in the appended claims.

I claim:

1. A power tong comprising: a shank portion; a head portion, said head portion being rotatably supported by said shank portion and arranged to receive a cylindrical member with the longitudinal axis thereof substantially coincident with the axis of rotation of said head portion; power means for rotating said head portion; a plurality of elements supported on said head portion for rotation therewith and mounted for other relative movement with respect to said head portion into gripping and non-gripping relation with such a cylindrical member; means operatively connected to said elements for actuating said elements into gripped and non-gripped relation with such a cylindrical member; said last mentioned means being operable independently of said power means for rotating said head portion.

2. A power tong comprising: a rotatably mounted head portion having an opening in which a cylindrical member may be positioned with its longitudinal axis substantially coincident with the axis of rotation of said head portion; power means operable to rotate said head portion; first means carried by said rotatable head portion including a plurality of movably mounted gripping members, said gripping members being actuatable into gripping engagement with such a cylindrical member upon energization of said means, and out of gripping engagement with said cylindrical member upon deenergization of said means; a stationary shank portion; second means mounted on said shank portion and having parts operable to energize said first means independently of said power means operable to rotate said head portion.

3. In a power tong: a rotatably mounted head portion having an opening in which a cylindrical member may be positioned with its longitudinal axis substantially coincident with the axis of rotation of said head portion; first means carried by said rotatable head portion including a plurality of movably mounted gripping members, said gripping members being actuated into gripping engagement with such a cylindrical member upon energization of said means, and out of gripping engagement with such a cylindrical member upon deenergization of said means; a shank portion; second means mounted on said shank portion and having parts operable to energize said first means; and reversible power means selectively operable to immediately and continuously rotate said head portion in either direction.

4. In a power tong: a rotatably mounted head portion having an opening in which a cylindrical member may be positioned with its longitudinal axis substantially coincident with the axis of rotation of said head portion; means for rotating said head portion; gripping members carried by said head portion and supported for movement into and out of engagement with such a cylindrical member in said position; means biasing said gripping members out of said engagement; means for actuating said gripping members into said engagement including a first part mounted for movement with said head portion, and a second part separate from said head portion; said second part being operable to a relative position of coaction with said first part to cause said actuation of said gripping members; and said first part and said second part being independently operable of said means for rotating said head portion.

5. In a power tong: a rotatably mounted head portion having an opening in which a pipe may be moved into a work position therein; a plurality of pipe gripping members carried by said head portion and mounted for relative movement into gripped and non-gripped relation with such a pipe; hydraulic means carried by said head portion, said hydraulic means being operable upon the mechanical application of an activating force thereto to actuate the gripping members; a shank portion; a force transmitting means mounted on said shank portion including a member movable in one direction to apply said activating force to said hydraulic means; and power means operable to rotate said head portion.

6. In a power tong: a rotatably mounted head portion having an opening in which a cylindrical member may be positioned with its longitudinal axis substantially coincident with the axis of rotation of said head portion; gripping members carried by said head portion supported for movement into and out of engagement with such a cylindrical member in said position; spring means biasing said gripping members out of said engagement; and means for applying a fluid pressure to actuate said gripping members against the action of said spring means into said engagement, including a cylinder and associated piston carried by said rotatable head portion and being relatively movable in one direction under an extraneous force to apply the fluid pressure, and relatively movable in an opposite direction under the action of said spring means, when the extraneous force is withdrawn.

7. In a power tong: a rotatably mounted head portion having an opening in which a cylindrical member may be positioned with its longitudinal axis substantially coincident with the axis of rotation of said head portion; a pair of gripping members actuatable by fluid pressure into engagement with such a cylindrical member so positioned; spring means acting to move said gripping members out of engagement wtih such a cylindrical member; and fluid pumping cylinder means carried by said rotatable head portion connected to said gripping members and having operatively associated piston means movable in one direction under an extraneous force to supply fluid pressure to said gripping members, and movable in an opposite direction by return of fluid pressure from said gripping members under the action of said springs, when the extraneous force is withdrawn.

8. In a power tong: a rotatably mounted head portion having an opening in which a cylindrical member may be positioned with its longitudinal axis substantially coincident with the axis of rotation of said head portion; a pair of gripping members actuatable by fluid pressure into engagement with such a cylindrical member so positioned; biasing means acting to move said gripping members out of engagement with such a cylindrical member; a pair of fluid pumping cylinders carried by said rotatable head portion connected to said gripping members and having operatively associated pistons connected for concerted movement in one direction under an extraneous force to supply fluid pressure to said gripping members, and movement in an opposite direction by return of fluid pressure from said gripping members under the action of said biasing means, when the extraneous force is withdrawn; and valve means for controlling fluid flow between said pumping cylinders and said gripping members.

9. In a power tong: a rotatably mounted head portion having an opening in which a cylindrical member may be positioned with its longitudinal axis substantially coincident with the axis of rotation of said head portion; a pair of gripping members actuatable by fluid pressure into engagement with such a cylindrical member so positioned; spring means acting to move said gripping members out of engagement with such a cylindrical member; a pair of fluid pumping cylinders connected to said gripping members having operatively associated pistons connected for concerted movement in one direction under an extraneous force to supply fluid pressure to said gripping members, and movement in an opposite direction by return of fluid pressure from said gripping members under the action of said springs, when the extraneous force is withdrawn; check valves permitting unidirectional flow only from said pumping cylinders to said gripping members, whereby the gripping members are held in said engagement with such a cylindrical member; and control valves in bypasses respectively around said check valves, whereby fluid flow from said gripping members to said pumping cylinders may be established.

10. In a power tong: a rotatably mounted head portion having an opening in which a cylindrical member may be positioned with its longitudinal axis substantially coincident with the axis of rotation of said head portion; a pair of gripping members actuatable by fluid pressure into engagement with such a cylindrical member so positioned; spring means acting to move said gripping members out of engagement with such a cylindrical member; a pair of fluid pumping cylinders connected to said gripping members having operatively associated pistons connected for concerted movement in one direction under an extraneous force to supply fluid pressure to said gripping members, and movement in an opposite direction by return of fluid pressure from said gripping members under the action of said springs, when the extraneous force is withdrawn; check valves permitting unidirectional flow only from said pumping cylinders to said gripping members and opposing flow between said members, whereby the gripping members are held in said engagement with such a cylindrical member; and other valve means selectively operable to establish bypass flow around said check valves, whereby fluid flow from said gripping members to said pumping cylinders may be established.

11. In a power tong: a rotatably mounted head portion having an opening in which a cylindrical member may be positioned with its longitudinal axis substantially coincident with the axis of rotation of said head portion; a pair of gripping members movable into and out of engagement with such a positioned cylindrical member; spring means biasing said gripping members out of said engagement; a yoke member supported for movement in opposite directions; motion transmitting means interconnecting said yoke member and gripping members; and means for applying an extraneous force to move said yoke member in a direction to move said gripping members against said spring means and into engagement with such a cylindrical member; means for latching said gripping members in said engagement; and means for releasing said latching means, whereupon said spring means acts to move said gripping members out of engagement, and said yoke member in an opposite direction, when the extraneous force is withdrawn.

12. In a power tong: a rotatably mounted head portion having an opening in which a cylindrical member may be positioned with its longitudinal axis substantially coincident with the axis of rotation of said head portion; a pair of gripping members movable into and out of engagement with such a positioned cylindrical member; spring means biasing said gripping members out of said engagement; a yoke member supported for movement in opposite directions; motion transmitting means interconnecting said yoke member and gripping members; including a link movable through a dead center to a position latching said gripping members in said engagement with such a cylindrical member; means for applying an extraneous force to move said yoke member in a direction to carry said link into said latching position against the action of said spring means, whereupon such force may be withdrawn; and means operable to move said link out of said latching position through said dead center, whereupon said spring means acts to move said gripping members out of said engagement, and said yoke member in an opposite direction.

13. In a power tong: a rotatably mounted head portion having an opening in which a cylindrical member may be positioned with its longitudinal axis substantially coincident with the axis of rotation of said head portion; gripping members carried by said head portion and having gripping and non-gripping positions relative to such a positioned cylindrical member; means carried by said head portion for actuating said gripping members to said positions including an element movable from one position to another position to actuate said gripping members into said gripping position; a shank portion; a fluid pressure actuated mechanism carried by said shank portion, said mechanism including a reciprocable rod adapted in one direction of its movement to move said element from said one position to said another position; and means for controlling the actuation of said mechanism.

14. In a power tong for pipes: a rotatable head portion; a plurality of pipe gripping members carried by said head portion and arranged for movements into gripped and non-gripped positions with respect to the outer surface of a pipe; means for actuating said members to said positions; a fluid pressure source; fluid pressure actuated power means connected to said source for applying a torque force to said head portion; a passage forming a fluid pressure bypass with respect to said power means; and an adjustable valve in said bypass; whereby such torque force applied to said head portion may be varied.

15. In a power tong for a pipe: a rotatably mounted head portion having a side opening through which a pipe may be relatively moved to a position with its longitudinal axis substantially in registration with the axis of rotation of said head portion; a plurality of pipe gripping members carried by said head portion and arranged for movements into gripped and non-gripped positions with respect to the outer surface of such a pipe; a fluid pressure source; fluid pressure actuated power means connected to said source for applying a torque force to rotate said head portion; and means jointly responsive to one position of said gripping members and a predetermined position of said side opening for terminating the application of such torque force to said head portion.

16. In a power tong for a pipe: a rotatably mounted head portion having a side opening through which a pipe may be relatively moved to a position with its longitudinal axis in substantial registration with the axis of rotation of said head portion; a plurality of pipe gripping members carried by said head portion and arranged for movements into gripped and non-gripped positions with respect to the outer surface of such a pipe; a fluid pressure source; fluid pressure actuated power means connected to said source for applying a torque force to rotate said head portion; and cam controlled means jointly responsive to a position of said gripping members and a predetermined position of said side opening for terminating the rotation of said head portion.

17. In a power tong for a pipe: a rotatably mounted head portion having a side opening through which a pipe may be relatively moved to a position with its longitudinal axis in substantial registration with the axis of rotation of said head portion; a plurality of pipe gripping members carried by said head portion and arranged for movements into gripped and non-gripped positions with respect to the outer surface of such a pipe; power means having a driving connection for rotating said head portion; and control means jointly responsive to a position of said gripping members and a predetermined position of said opening for terminating the rotation of said head portion by said power means.

18. In a power tong for a pipe: a rotatably mounted head portion having a side opening through which a pipe may be relatively moved to a position with its longitudinal axis in registration with the axis of rotation of said head portion; a pipe gripping member supported on said head portion for movement into gripped and non-gripped positions with respect to the outer surface of such a pipe; actuating means for said pipe gripping member carried by said head portion and including an element movable from one position to another position in response to the application of an extraneous force, said positions of said element respectively corresponding with the non-gripped and gripped positions of said member; a shank portion; a power actuated force applying member supported by said shank portion for selective movement to extended and retracted positions, movement to extended position operating to move said element from said one position to said another position; a power device having a driving connection for rotating said head portion; and control means for terminating the driving action of said device when said element is in said one position, and when said force applying member is in other than its retracted position.

19. In a power tong: a shank portion; a head portion; said head portion being rotatably supported on said shank portion and arranged to receive a cylindrical member into a position with its longitudinal axis substantially coincident with the axis of rotation of said head portion; power means for applying torque to said head portion; means supported on head portion part for rotation therewith and mounted for relative movements with respect to such a member into gripped and non-gripped relation therewith; other power means carried solely by said head portion energizable to actuate said second mentioned means into gripped and non-gripped relation with such a cylindrical member; said other power means being operable independently of said first mentioned power means.

References Cited in the file of this patent

UNITED STATES PATENTS

| | | |
|---|---|---|
| 2,618,468 | Lundeen | Nov. 18, 1952 |
| 2,639,894 | Smith | May 26, 1953 |
| 2,650,070 | Lundeen | Aug. 25, 1953 |
| 2,741,460 | Gardner | Apr. 10, 1956 |
| 2,746,329 | Paget | May 22, 1956 |
| 2,780,950 | Province | Feb. 12, 1957 |
| 2,784,626 | Paget | Mar. 12, 1957 |
| 2,846,909 | Mason | Aug. 12, 1958 |